United States Patent
Clark et al.

(10) Patent No.: US 12,272,349 B2
(45) Date of Patent: *Apr. 8, 2025

(54) ATTENTION-BASED CLOCKWORK HIERARCHICAL VARIATIONAL ENCODER

(71) Applicant: Google LLC, Mountain View, CA (US)

(72) Inventors: Robert Clark, Hertfordshire (GB); Chun-An Chan, Mountain View, CA (US); Vincent Wan, London (GB)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/487,227

(22) Filed: Oct. 16, 2023

(65) Prior Publication Data

US 2024/0038214 A1    Feb. 1, 2024

Related U.S. Application Data

(63) Continuation of application No. 17/756,264, filed as application No. PCT/US2019/065566 on Dec. 10, 2019.

(51) Int. Cl.
*G10L 13/10*    (2013.01)
*G10L 25/30*    (2013.01)

(52) U.S. Cl.
CPC .............. *G10L 13/10* (2013.01); *G10L 25/30* (2013.01); *G10L 2013/105* (2013.01)

(58) Field of Classification Search
CPC ........ G06F 40/58; G06F 3/0481; G06F 40/30; G06N 3/044; G06N 3/045; G06N 3/047;

(Continued)

(56) References Cited

U.S. PATENT DOCUMENTS

| | | | | |
|---|---|---|---|---|
| 5,715,372 A | * | 2/1998 | Meyers | ................... H04M 3/22 704/200 |
| 7,340,393 B2 | * | 3/2008 | Mitsuyoshi | ........... G10L 13/033 704/200 |

(Continued)

OTHER PUBLICATIONS

Park Jungbae et al., "Phonemic-level Duration Control Using Attention Alignment for Natural Speech Synthesis", ICASSP 2019—2019 IEEE International Conference on Acoustics, Speech and Signal Processing (ICASSP), IEEE, May 12, 2019 (May 12, 2019), p. 5896-5900, XP033566377.

(Continued)

*Primary Examiner* — Gerald Gauthier
(74) *Attorney, Agent, or Firm* — Honigman LLP; Brett A. Krueger; Grant Griffith

(57) ABSTRACT

A method for representing an intended prosody in synthesized speech includes receiving a text utterance having at least one word, and selecting an utterance embedding for the text utterance. Each word in the text utterance has at least one syllable and each syllable has at least one phoneme. The utterance embedding represents an intended prosody. For each syllable, using the selected utterance embedding, the method also includes: predicting a duration of the syllable by decoding a prosodic syllable embedding for the syllable based on attention by an attention mechanism to linguistic features of each phoneme of the syllable and generating a plurality of fixed-length predicted frames based on the predicted duration for the syllable.

28 Claims, 10 Drawing Sheets

(58) Field of Classification Search
CPC .......... G06N 3/08; G06N 3/084; G06N 3/088; G06N 20/00; G10L 13/047; G10L 13/06; G10L 13/10; G10L 15/16; G10L 25/24; G10L 25/30; G10L 2013/105; G10L 13/033; G10L 15/08; G10L 15/183; G10L 25/78; H04M 3/527; H04M 3/22; H04N 7/15

See application file for complete search history.

(56) References Cited

U.S. PATENT DOCUMENTS

| | | | | |
|---|---|---|---|---|
| 8,280,013 | B2* | 10/2012 | Bushey | H04M 3/527 704/200 |
| 8,412,528 | B2 | 4/2013 | Fischer et al. | |
| 8,571,849 | B2* | 10/2013 | Bangalore | G06F 40/58 704/235 |
| 8,886,542 | B2* | 11/2014 | Lagadec | G10L 13/047 704/270.1 |
| 11,182,566 | B2* | 11/2021 | Jaitly | G10L 15/16 |
| 11,404,045 | B2* | 8/2022 | Choi | G10L 25/30 |
| 11,514,888 | B2* | 11/2022 | Finkelstein | G10L 17/18 |
| 11,640,832 | B2* | 5/2023 | Ma | G06F 40/30 704/200 |
| 11,657,800 | B2* | 5/2023 | Kim | G10L 15/08 704/200 |
| 11,688,399 | B2* | 6/2023 | Diamant | H04N 7/15 704/200 |
| 11,694,675 | B2* | 7/2023 | Aoki | G06N 20/00 704/200 |
| 11,705,105 | B2* | 7/2023 | Chae | G10L 25/60 704/200 |
| 11,715,485 | B2* | 8/2023 | Park | G06N 3/08 704/200 |
| 11,727,939 | B2* | 8/2023 | Grancharov | G10L 15/08 704/200 |
| 11,776,544 | B2* | 10/2023 | Kim | G06N 3/08 704/200 |
| 11,790,935 | B2* | 10/2023 | Lee | G02B 27/0172 704/200 |
| 12,080,272 | B2* | 9/2024 | Clark | G10L 13/10 |
| 2005/0154581 | A1* | 7/2005 | Ferrieux | G10L 15/183 704/200 |
| 2006/0235690 | A1* | 10/2006 | Tomasic | G06F 3/0481 704/200 |
| 2011/0246076 | A1* | 10/2011 | Su | G06N 20/00 704/200 |
| 2012/0271634 | A1* | 10/2012 | Lenke | G10L 25/78 704/E15.005 |
| 2017/0345411 | A1* | 11/2017 | Raitio | G10L 13/06 |
| 2019/0348020 | A1* | 11/2019 | Clark | G06N 3/047 |
| 2020/0074985 | A1* | 3/2020 | Clark | G10L 25/24 |
| 2022/0051654 | A1* | 2/2022 | Finkelstein | G06N 3/088 |
| 2022/0139377 | A1* | 5/2022 | Lee | G10L 15/08 704/200 |
| 2022/0415306 | A1* | 12/2022 | Clark | G06N 3/047 |
| 2023/0064749 | A1* | 3/2023 | Finkelstein | G06N 3/084 |
| 2023/0230572 | A1* | 7/2023 | Biadsy | G10L 21/003 704/200 |
| 2023/0298577 | A1* | 9/2023 | Yasa | G10L 15/22 704/200 |
| 2024/0038214 | A1* | 2/2024 | Clark | G06N 3/045 |

OTHER PUBLICATIONS

Yibin Zheng et al, "BLSTM-CRF Based End-to-End Prosodic Boundary Prediction with Context Sensitive Embeddings in a Text-to-Speech Front-End", Interspeech 2018, Jan. 1, 2018 (Jan. 1, 2018), p. 47-51, XP055697974.

Yuxuan Wang et al, "Tacotron: Towards End-To-End Speech Synthesis", DOI: 10.21437/ Interspeech.2017-1452 external link Apr. 6, 2017 (Apr. 6, 2017), Retrieved from the Internet: URL:https://arxiv.org/pdf/1703.10135.pdf, XP055642526.

Jun. 17, 2021 Written Opinion (WO) of the International Searching Authority (ISA) and International Search Report (ISR) issued in International Application No. PCT/US2019/065566.

Intellectual Property India. Examination report relating to application No. 202227026391, dated Aug. 30, 2022.

* cited by examiner

ATTENTION-BASED CLOCKWORK HIERARCHICAL VARIATIONAL ENCODER

This U.S. patent application is a continuation of, and claims priority under 35 U.S.C. § 120 from, U.S. patent application Ser. No. 17/756,264, filed on May 20, 2022, which is a national phase application of, and claims priority under 35 U.S.C. § 371 from, international Application PCT/US2019/065566, filed on Dec. 10, 2019. The disclosures of these prior applications are considered part of the disclosure of this application and are hereby incorporated by reference in their entireties.

TECHNICAL FIELD

This disclosure relates to an attention-based clockwork hierarchical variational encoder.

BACKGROUND

Speech synthesis systems use text-to-speech (TTS) models to generate speech from textual input. The generated/synthesized speech should accurately convey the message (intelligibility) while sounding like human speech (naturalness) with an intended prosody (expressiveness). While traditional concatenative and parametric synthesis models are capable of providing intelligible speech and recent advances in neural modeling of speech have significantly improved the naturalness of synthesized speech, most existing TTS models are ineffective at modeling prosody, thereby causing synthesized speech used by important applications to lack expressiveness. For instance, it is desirable for applications such as conversational assistants and long-form readers to produce realistic speech by imputing prosody features not conveyed in textual input, such as intonation, stress, and rhythm and style. For example, a simple statement can be spoken in many different ways depending on whether the statement is a question, an answer to a question, there is uncertainty in the statement, or to convey any other meaning about the environment or context which is unspecified by the input text.

SUMMARY

One aspect of the disclosure provides a method for an attention-based clockwork hierarchical variational encoder. The method includes receiving, at data processing hardware, a text utterance having at least one word, each word having at least one syllable, each syllable having at least one phoneme. The method also includes selecting, by the data processing hardware, an utterance embedding for the text utterance. The utterance embedding representing an intended prosody. For each syllable, using the selected utterance embedding, the method includes predicting, by the data processing hardware, a duration of the syllable by decoding a prosodic syllable embedding for the syllable based on attention by an attention mechanism to linguistic features of each phoneme of the syllable. For each syllable, using the selected utterance embedding, the method also includes generating, by the data processing hardware, a plurality of fixed-length predicted frames based on the predicted duration for the syllable.

Implementations of the disclosure may include one or more of the following optional features. In some implementations, the method includes predicting, by the data processing hardware, a pitch contour of the syllable based on the predicted duration for the syllable. In this implementation, when the plurality of fixed-length predicted frames includes fixed-length predicted pitch frames, each fixed-length predicted pitch frame represents part of the predicted pitch contour of the syllable.

In some examples, for each syllable, using the selected utterance embedding, the method includes predicting, by the data processing hardware, an energy contour of each syllable based on the predicted duration for the syllable. In this example, the method also includes generating, by the data processing hardware, a plurality of fixed-length predicted energy frames based on the predicted duration for a corresponding syllable, each fixed-length energy frame representing the predicted energy contour of the corresponding syllable. The plurality of fixed length predicted frames may include fixed-length predicted spectral frames for the syllable.

In some configurations, a network representing a hierarchical linguistic structure of the text utterance includes a first level including each word of the text utterance, a second level including each syllable of the text utterance, and a third level including each fixed-length predicted frame for each syllable of the text utterance. Here, the first level of the network representing the hierarchical linguistic structure may include a long short-term memory (LSTM) processing block representing each word of the text utterance. The second level of the network representing the hierarchical linguistic structure may include a LSTM processing block representing each syllable of the text utterance, the LSTM processing blocks of the second level clocking relative to and faster than the LSTM processing blocks of the first level. The third level of the network representing the hierarchical linguistic structure may include a LSTM processing block representing each fixed-length predicted frame, the LSTM processing blocks of the third level clocking relative to and faster than the LSTM processing blocks of the second level.

In some configurations, predicting the duration of the syllable includes, for each phoneme associated with the syllable, encoding one or more linguistic features of a corresponding phoneme, inputting the encoded one or more linguistic features into the attention mechanism, and applying the attention of the attention mechanism to the prosodic syllable embedding. The prosodic syllable embedding may include a first syllable embedding based on frames corresponding to the utterance embedding and a second syllable embedding based on phoneme linguistic features associated with one or more phonemes of the utterance embedding.

In some examples, the method includes receiving, by the data processing hardware, training data including a plurality of reference audio signals and training, by the data processing hardware, a deep neural network for a prosody model by encoding each reference audio signal into a corresponding fixed-length utterance embedding representing the corresponding prosody of the reference audio signal. In this example, each reference audio signal includes a spoken utterance of human speech and having a corresponding prosody. Here, the method may include generating, by the data processing hardware, the selected utterance embedding by encoding linguistic features for a plurality of linguistic units with a frame-based syllable embedding and a phone feature-based syllable embedding. The utterance embedding may include a fixed-length numerical vector.

In some implementations, the attention of the attention mechanism includes location-based attention. The location-based attention may include monotonically shifting, location sensitive attention, the monotonically shifting, location sensitive attention defined by a window of phoneme information for a respective syllable. The attention mechanism may include a transformer.

Another aspect of the disclosure provides a system for an attention-based clockwork hierarchical variational encoder. The system includes data processing hardware and memory hardware in communication with the data processing hardware. The memory hardware stores instructions that when executed on the data processing hardware cause the data processing hardware to perform operations. The operations include receiving a text utterance having at least one word, each word having at least one syllable, each syllable having at least one phoneme. The operations also include selecting an utterance embedding for the text utterance, the utterance embedding representing an intended prosody. For each syllable, using the selected utterance embedding, the operations further include predicting a duration of the syllable by decoding a prosodic syllable embedding for the syllable based on attention by an attention mechanism to linguistic features of each phoneme of the syllable. For each syllable, using the selected utterance embedding, the operations also include generating a plurality of fixed-length predicted frames based on the predicted duration for the syllable.

This aspect may include one or more of the following optional features. In some configurations, the operations include predicting a pitch contour of the syllable based on the predicted duration for the syllable and when the plurality of fixed-length predicted frames include fixed-length predicted pitch frames, each fixed-length predicted pitch frame represents part of the predicted pitch contour of the syllable. For each syllable, the operations may include, using the selected utterance embedding, predicting an energy contour of each syllable based on the predicted duration for the syllable and generating a plurality of fixed-length predicted energy frames based on the predicted duration for a corresponding syllable, each fixed-length energy frame representing the predicted energy contour of the corresponding syllable. The plurality of fixed length predicted frames may include fixed-length predicted spectral frames for the syllable.

In some examples, a network representing a hierarchical linguistic structure of the text utterance includes a first level including each word of the text utterance, a second level including each syllable of the text utterance, and a third level including each fixed-length predicted frame for each syllable of the text utterance. Here, the first level of the network representing the hierarchical linguistic structure may include a long short-term memory (LSTM) processing block representing each word of the text utterance. The second level of the network representing the hierarchical linguistic structure may include a LSTM processing block representing each syllable of the text utterance, the LSTM processing blocks of the second level clocking relative to and faster than the LSTM processing blocks of the first level. The third level of the network representing the hierarchical linguistic structure may include a LSTM processing block representing each fixed-length predicted frame, the LSTM processing blocks of the third level clocking relative to and faster than the LSTM processing blocks of the second level.

In some implementations, predicting the duration of the syllable includes, for each phoneme associated with the syllable, encoding one or more linguistic features of a corresponding phoneme, inputting the encoded one or more linguistic features into the attention mechanism, and applying the attention of the attention mechanism to the prosodic syllable embedding. The prosodic syllable embedding may include a first syllable embedding based on frames corresponding to the utterance embedding and a second syllable embedding based on phoneme linguistic features associated with one or more phonemes of the utterance embedding.

In some configurations, the operations include receiving training data including a plurality of reference audio signals, each reference audio signal including a spoken utterance of human speech and having a corresponding prosody. In this configuration, the operations also include training a deep neural network for a prosody model by encoding each reference audio signal into a corresponding fixed-length utterance embedding representing the corresponding prosody of the reference audio signal. Here, the operations may include generating the selected utterance embedding by encoding linguistic features for a plurality of linguistic units with a frame-based syllable embedding and a phone feature-based syllable embedding. The utterance embedding may include a fixed-length numerical vector.

In some examples, the attention of the attention mechanism includes location-based attention. Here, the location-based attention may include monotonically shifting, location sensitive attention, the monotonically shifting, location sensitive attention defined by a window of phoneme information for a respective syllable. The attention mechanism may include a transformer.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
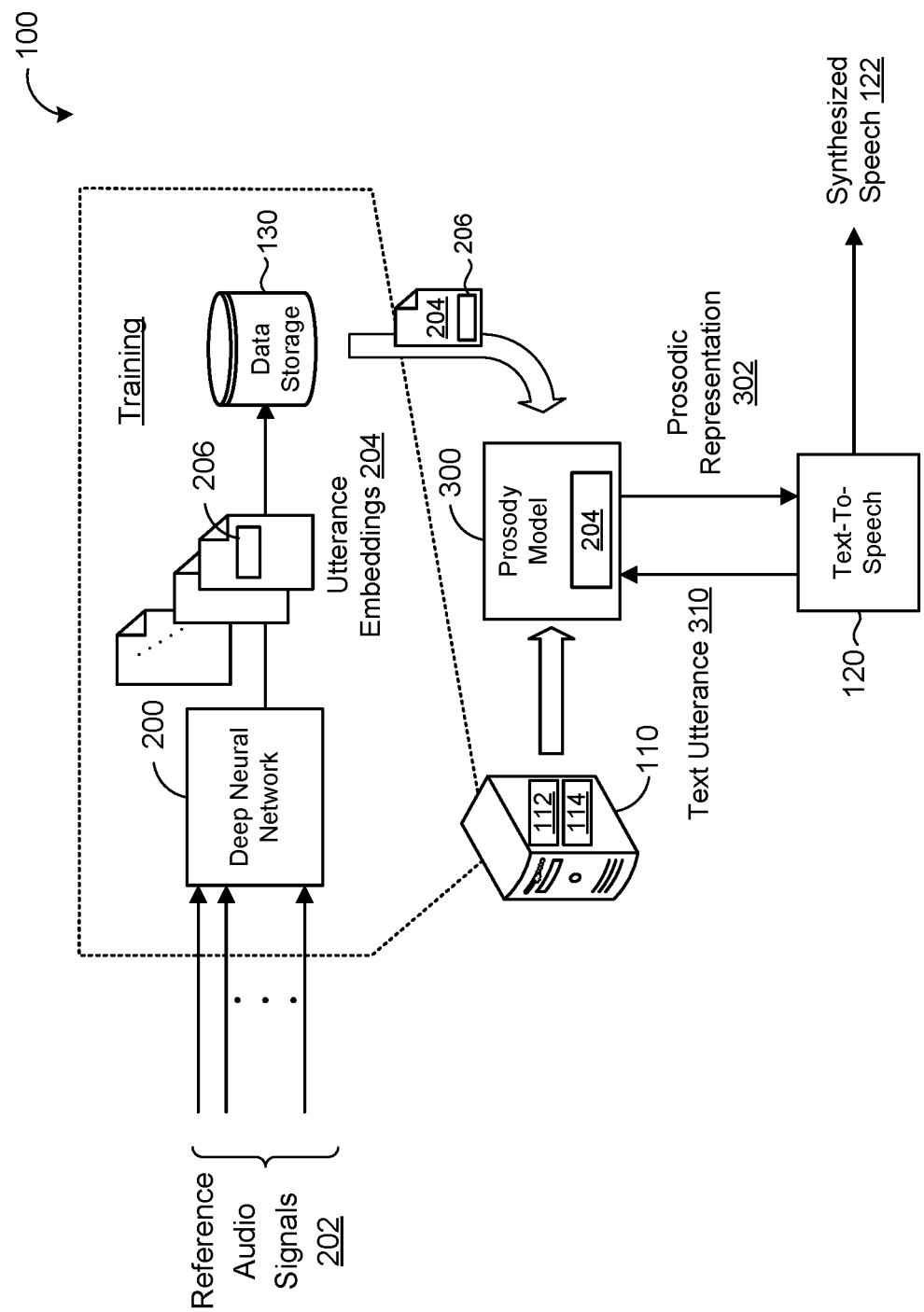
FIG. 1 is a schematic view of an example system for training a deep neural network to provide a controllable prosody model for use in predicting a prosodic representation for a text utterance.

Text-to-speech (TTS) models, often used by speech synthesis systems, are generally only given text inputs without any reference acoustic representation at runtime, and must impute many linguistic factors that are not provided by the text inputs in order to produce realistically sounding synthesized speech. A subset of these linguistic factors are collectively referred to as prosody and may include intonation (pitch variation), stress (stressed syllables vs. non-stressed syllables), duration of sounds, loudness, tone, rhythm, and style of the speech. Prosody may indicate the emotional state of the speech, the form of the speech (e.g., statement, question, command, etc.), the presence of irony or sarcasm of the speech, uncertainty in the knowledge of the speech, or other linguistic elements incapable of being encoded by grammar or vocabulary choice of the input text. Accordingly, a given text input that is associated with a high degree of prosodic variation can produce synthesized speech with local changes in pitch and speaking duration to convey different semantic meanings, and also with global changes in the overall pitch trajectory to convey different moods and emotions.

Neural network models provide potential for robustly synthesizing speech by predicting linguistic factors corresponding to prosody that are not provided by text inputs. As a result, a number of applications, such as audiobook narration, news readers, voice design software, and conversational assistants can produce realistically sounding synthesized speech that is not monotonous-sounding. Implementations herein are directed toward a neural network model that includes a variational autoencoder (VAE) having an encoder portion for encoding a reference audio signal corresponding to a spoken utterance into an utterance embedding that represents the prosody of the spoken utterance, and a decoder portion that decodes the utterance embedding to predict durations of syllables and pitch and energy contours for each syllable.

The encoder portion may train utterance embeddings representing prosody by encoding numerous reference audio signals conditioned on linguistic features representing the utterances. The linguistic features may include, without limitation, individual sounds for each phoneme, whether each syllable is stressed or un-stressed, the type of each word (e.g., noun/adjective/verb) and/or the position of the word in the utterance, and whether the utterance is a question or phrase. Each utterance embedding is represented by a fixed-length numerical vector. In some implementations, the fixed-length numerical vector includes a value equal to 256. However, other implementations may use fixed-length numerical vectors having values greater than or less than 256 (e.g., 128). The decoder portion may decode a fixed-length utterance embedding into a sequence of syllable durations via a first decoder and into a sequence of fixed-length frames (e.g., five millisecond) of pitch and energy using the syllable durations. During training, the syllable durations and fixed-length frames of pitch and energy predicted by the decoder portion closely match the syllable durations and fixed-length frames of pitch and energy sampled from the reference audio signal associated with the fixed-length utterance embedding.

The VAE of the present disclosure includes a Clockwork Hierarchal Variational Autoencoder (CHiVE) that incorporates hierarchical stacked layers of long-short term-memory (LSTM) blocks, with each layer of LSTM blocks incorporating structure of the utterance. Here, each LSTM block may be divisible into one or more LSTM cell. Since an utterance may be divisible into any one or combination of linguistic units such as phonemes, syllables, words, phrases, or sentences, the LSTM blocks may include one or more layers representing such units. For instance, the LSTM blocks include LSTM cells include one or more layers representing phonemes, syllables words, phrases, or sentences. Moreover, the hierarchy of stacked layers of LSTM cells are variably clocked to a length of hierarchical input data. For instance, if the input data contains a word of three syllables followed by a word of four syllables, then the syllable layer of the CHiVE would clock three times relative to a single clock of the word layer for the first input word, and then the syllable layer would clock four more times relative to a subsequent single clock of the word layer for the second word. Thus, rather than using frame-based techniques where memory associated with given LSTM cell is only effective for about a half second (i.e., 100 times steps with a five (5) millisecond frame rate), and thus, only providing the LSTM cell memory for two or three syllables of speech, the phoneme, word, and syllable layers of the CHiVE clock with phonemes, words, and syllables, respectively, giving the LSTM cells of the stacked layers memory over the last 100 words, syllables, or phonemes. Additionally or alternatively, the CHiVE may be adapted to use other forms of a neural network (NN) or a recurrent neural network (RNN) instead of using a LSTM structure for the hierarchical layers to represent an utterance structure.

During inference, the CHiVE is configured to receive a text utterance and select an utterance embedding for the text utterance. The received text utterance has at least one word, each word has at least one syllable, and each syllable has at least one phoneme. Since the text utterance is missing context, semantic information, and pragmatic information to guide the appropriate prosody for producing synthesized speech from the utterance, the CHiVE uses that selected utterance embedding as the latent variable to represent an intended prosody. Thereafter, the CHiVE uses the selected utterance embedding to predict a duration of each syllable by encoding linguistic features of each phoneme contained in the syllable with a corresponding prosodic syllable embedding for the syllable, and predict a pitch of each syllable based on the predicted duration for the syllable. Lastly, the CHiVE is configured to generate a plurality of fixed-length pitch frames based on the predicted duration for each syllable such that each fixed-length pitch frame represents the predicted pitch of the syllable. The CHiVE may similarly predict energy (e.g., loudness) of each syllable based on the predicted duration for the syllable and generate a plurality of fixed-length energy frames each representing the predicted energy of the syllable. The fixed-length pitch and/or energy frames may be provided to a unit-selection model or wave-net model of a TTS system to produce the synthesized speech with the intended prosody provided by the input fixed-length utterance embedding.

Generally speaking, some speech synthesis systems may be divided into two phases. A first phase that generates a linguistic specification that identifies factors affecting speech sounds contained within an utterance and a second phase that uses the linguistic specification to generate a waveform for synthetic speech. In some examples, instead of predicting linguistic characteristics that another aspect of the speech synthesis system uses to generate speech, the CHiVE is alternatively or additionally configured to predict spectral frames (e.g., a plurality of fixed-length spectral frames such as mel frames). By predicting spectral frames, the CHiVE may minimize further processing for a speech synthesis system to generate the waveform from the linguistic specification. Here, the CHiVE uses the selected utterance embedding to predict a duration of each syllable by encoding linguistic features of each phoneme contained in the syllable with a corresponding prosodic syllable embedding for the syllable. With the predicted duration for each syllable, the CHiVE may generate a plurality of fixed-length spectral frames. For instance, a first decoder generates a predicted duration for each syllable that indicates a number of spectral frames that a second decoder should generate for each syllable. The second decoder then sequence decodes the number of spectral frames indicated by the predicted duration for each syllable. Spectral frames may then be used by a speech synthesis system to generate synthetic speech. For example, the spectral frames are provided to a neural vocoder.

Unfortunately, relying on certain linguistic units may have its setbacks to predict linguistic factors such as pitch, energy, or spectral frames. In particular, speech samples (e.g., recorded samples that train speech synthesis systems) have some likelihood of inaccurate phoneme sequences. Due to these inaccuracies, it may be more reliable to use syllable alignment (e.g., syllable boundaries), then phonetic boundaries. With phonemes, it may not be easy or straightforward to clearly define each anticipated phoneme from a speech sample. A person may try to pronounce three phonemes, but depending on the context or the dialect of the person, the person may not clearly or accurately pronounce each phoneme. With collected samples, there may be differences in phonetic (phoneme-level) dialect between people providing the samples or between samples from the same person. Sometimes the same person may pronounce a word differently depending on the sentence or a communication speed of the person. A person may blend phonemes or drop phonemes entirely when speaking quickly.

As another example, often a local dialect lacks clear distinct pronunciation for words that are more commonly used within that locality. To illustrate, this may occur with city names. For example, the city of Edinburgh has at least three syllables—"Ed-in-burgh," but when stated in fast-running speech or using local dialect, it may be pronounced, "Em-bra," and essentially truncated to two syllables. With these two syllables, it is difficult to match all the phonemes that one would expect to be present in the pronunciation of Edinburgh (e.g., the three-syllable form). These pronunciation differences may occur in short basic words or larger words with multiple syllables. For example, a simple word like "that" with a pronunciation of "th-ahh-t" may be reduced to "thuht." When the pronunciation of the speech is sub-optimal (e.g., becomes lax or hurried), the phoneme sequence present in a sample is not necessarily accurate. If a model tried to assign phonemes to these types of inaccurate phoneme samples, the model risks making an error.

To overcome some of these phoneme issues that may cause untrustworthy data, the CHiVE may use an approach that does not rely on phoneme alignment. For example, the CHiVE tries to predict the number of frames for a syllable independent of the number of phonemes. Here, the CHiVE may not know anything about the individual number of frames per phoneme anymore. In some examples, the information about phonetic content of a syllable is based on linguistic features for a phoneme (e.g., any linguistic information about a syllable). In these examples, the CHiVE uses linguistic features for a phoneme that are encoded and provided to an attention mechanism to predict syllable information (e.g., the number of frames per syllable).

FIG. 1 shows an example system 100 for training a deep neural network 200 to provide a controllable prosody model 300, and for predicting a prosodic representation 302 for a text utterance 310 using the prosody model 300. The system 100 includes a computing system 110 having data processing hardware 112 and memory hardware 114 in communication with the data processing hardware 112 and storing instructions that cause the data processing hardware 112 to perform operations. In some implementations, the computing system 110 (e.g., the data processing hardware 112) provides a prosody model 300 based on a trained deep neural network 200 to a text-to-speech (TTS) system 120 for controlling prosody of synthesized speech 122 from an input text utterance 310. Since the input text utterance 310 has no way of conveying context, semantics, and pragmatics to guide the appropriate prosody of the synthesized speech 122, the prosody model 300 may predict a prosodic representation 302 for the input text utterance 310 by conditioning the model 300 on linguistic features extracted from the text utterance 310 and using a fixed-length utterance embedding 204 as a latent variable representing an intended prosody for the text utterance 310. In some examples, the computing system 110 implements the TTS system 120. In other examples, the computing system 110 and the TTS system 120 are distinct and physically separate from one another. The computing system 120 may include a distributed system (e.g., cloud computing environment).

In some implementations, the deep neural network 200 is trained on a large set of reference audio signals 202. Each reference audio signal 202 may include a spoken utterance of human speech recorded by a microphone and having a prosodic representation. During training, the deep neural network 200 may receive multiple reference audio signals 202 for a same spoken utterance, but with varying prosodies (i.e., the same utterance can be spoken in multiple different ways). Here, the reference audio signals 202 are of variable-length such that the duration of the spoken utterances varies even though the content is the same. The deep neural network 200 is configured to encode/compress the prosodic representation associated with each reference audio signal 202 into a corresponding fixed-length utterance embedding 204. The deep neural network 200 may store each fixed-length utterance embedding 204 in an utterance embedding storage 130 (e.g., on the memory hardware 114 of the computing system 110) along with a corresponding transcript 206 of the reference audio signal 202 associated the utterance embedding 204. The deep neural network 200 may be further trained by back-propagating the fixed-length utterance embeddings 204 conditioned upon linguistic features extracted from the transcripts 206 to generate fixed-length frames of pitch, energy, and duration of each syllable.

During inference, the computing system 110 may use the prosody model 300 to predict a prosodic representation 302 for a text utterance 310. The prosody model 300 may select an utterance embedding 204 for the text utterance 310. The utterance embedding 204 represents an intended prosody of the text utterance 310. Described in greater detail below with reference to FIGS. 2A-2C and 3A-3D, the prosody model 300 may predict the prosodic representation 302 for the text utterance 310 using the selected utterance embedding 204. The prosodic representation 302 may include predicted pitch, predicted timing, and predicted loudness (e.g., energy) for the text utterance 310. In the example shown, the TTS system 120 uses the prosodic representation 302 to produce synthesized speech 122 from the text utterance 310 and having the intended prosody.

Figure 2A:
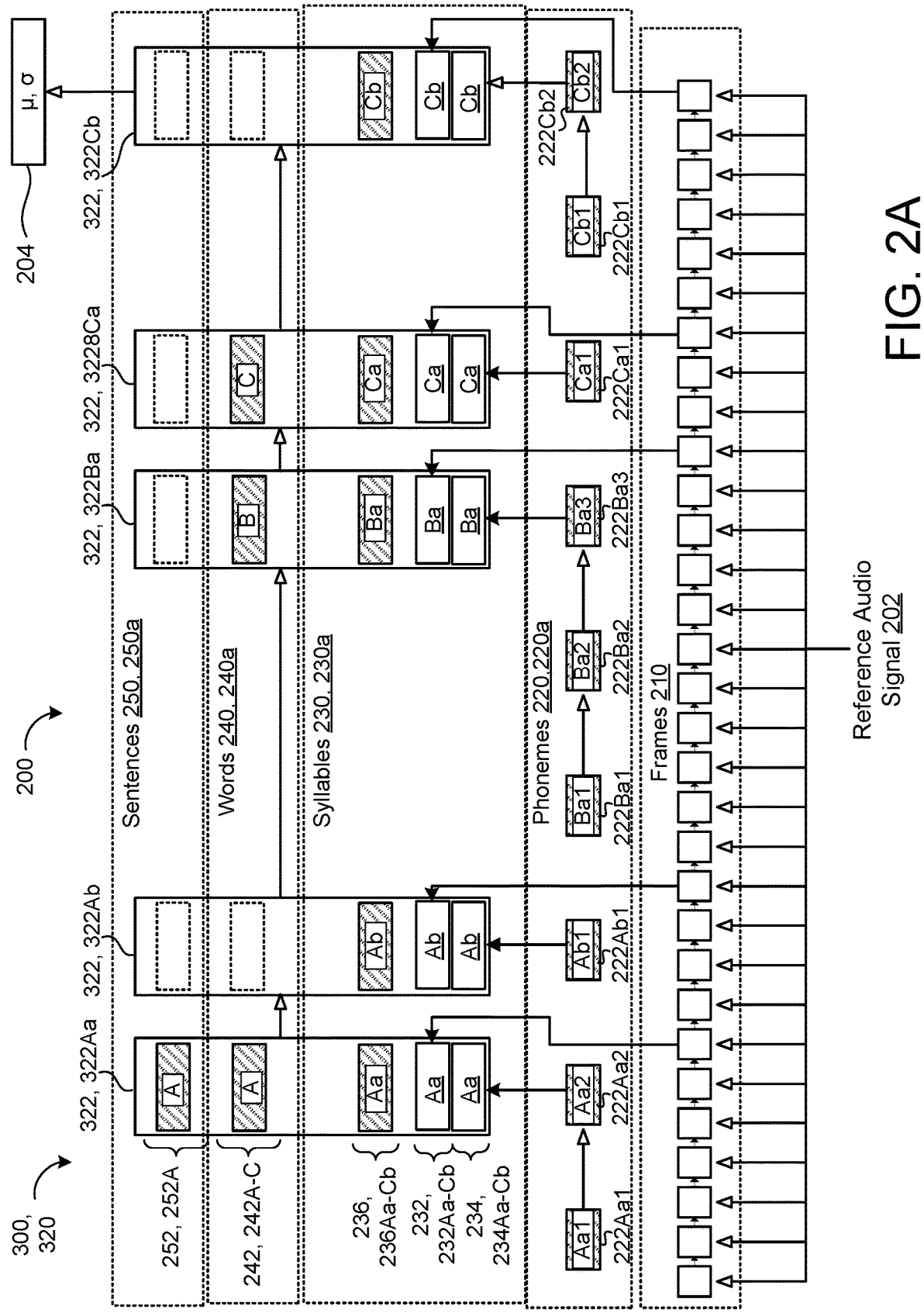
FIG. 2A is a schematic view of a hierarchical linguistic structure for encoding prosody of a reference audio signal into a fixed-length utterance embedding.
Figure 2B:
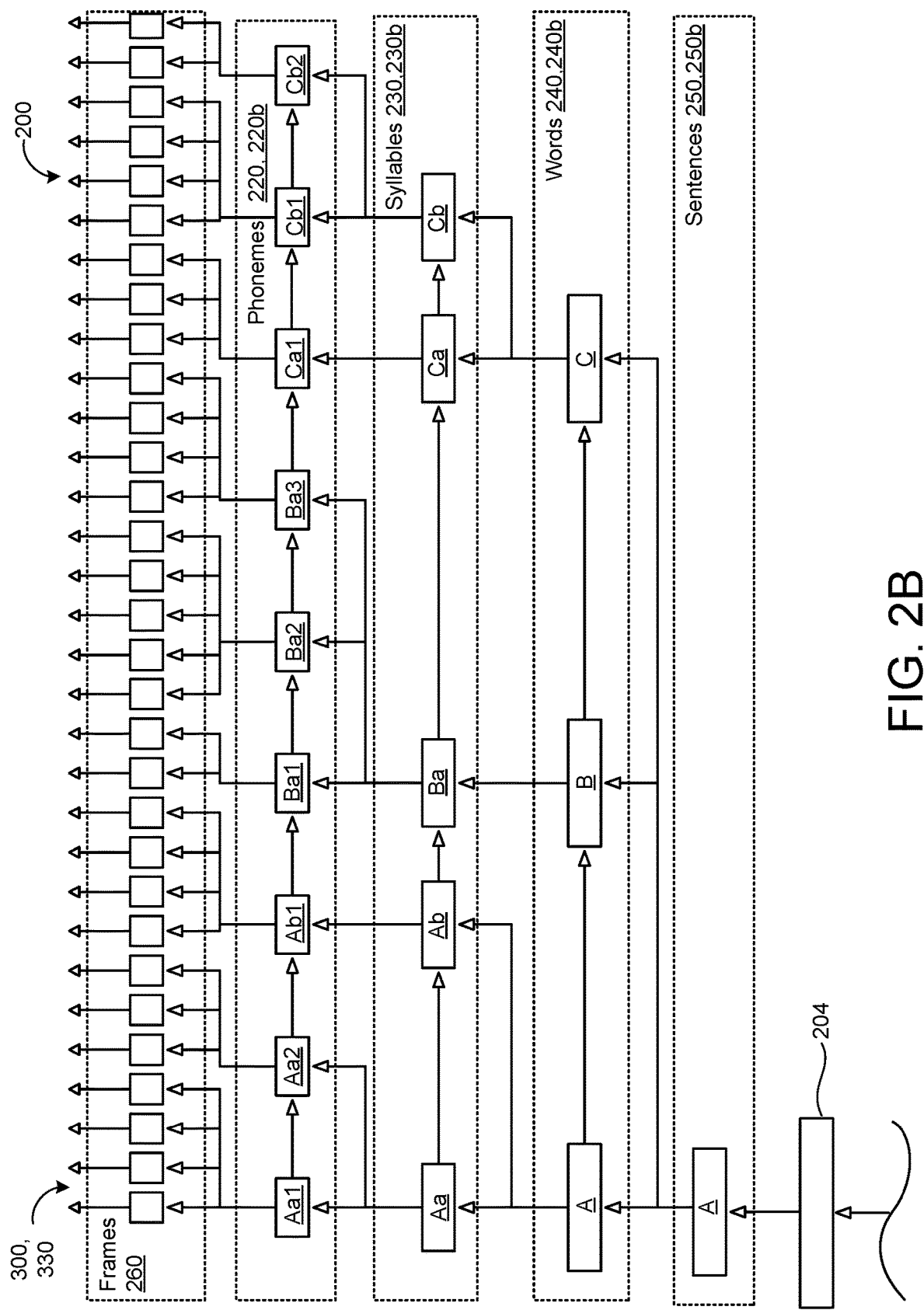
FIGS. 2B and 2C are schematic views of a hierarchical linguistic structure using utterance embedding to predict a prosodic representation of a text utterance.
Figure 2C:
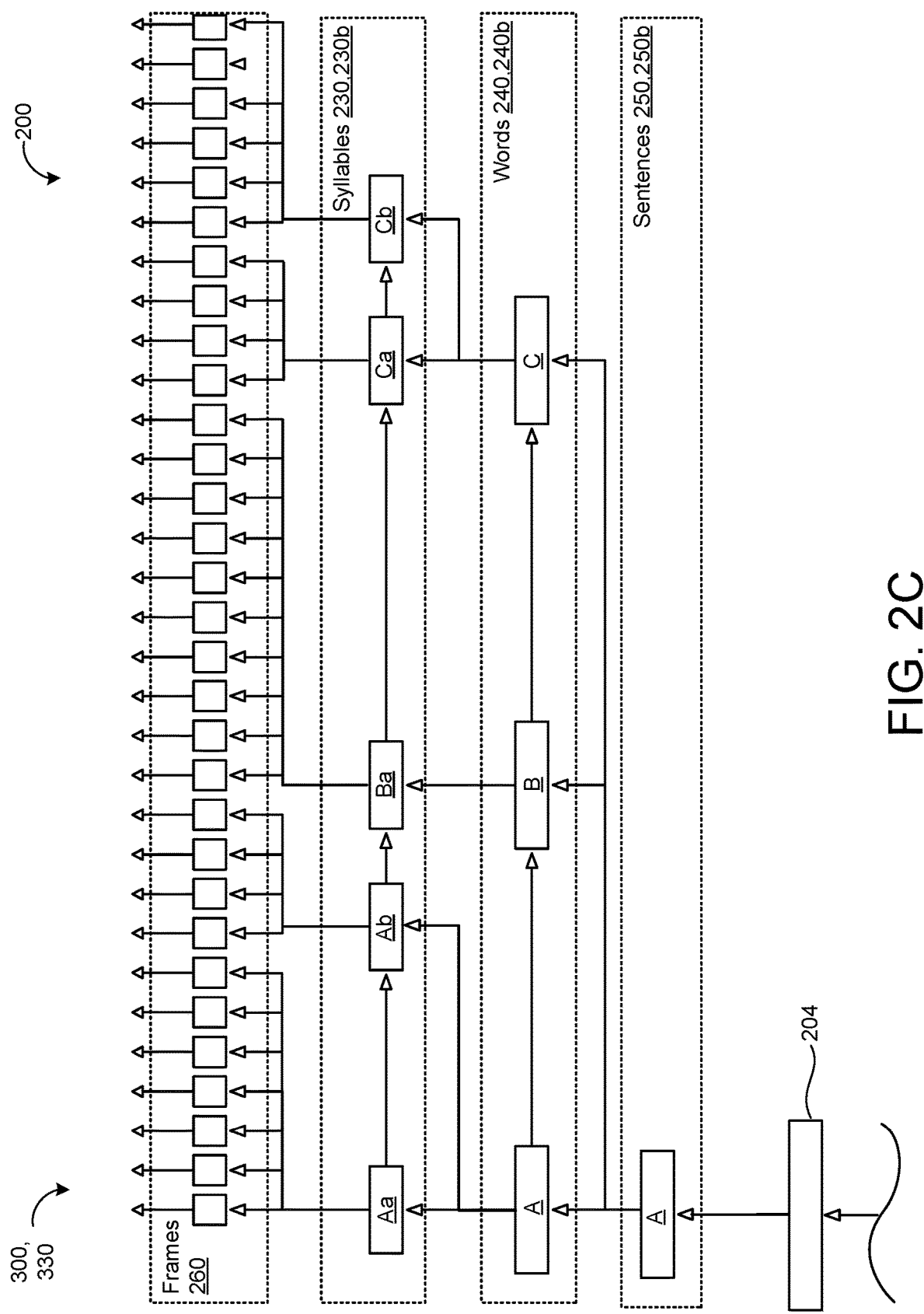

FIGS. 2A-2C show a hierarchical linguistic structure (e.g., deep neural network of FIG. 1) 200 for a clockwork hierarchal variational autoencoder (CHiVE) 300 ('autoencoder 300') that provides a controllable model of prosody. The controllable model of prosody may jointly predict, for each syllable of given input text, a duration of the syllable and pitch (F0) and energy (C0) contours for the syllable without relying on any unique mappings from the given input text or other linguistic specification to produce synthesized speech 122 having an intended/selected prosody. The autoencoder 300 includes an encoder portion 320 (FIG. 2A) that encodes a plurality of fixed-length reference frames 210 sampled from a reference audio signal 202 into a fixed-length utterance embedding 204, and a decoder portion 330 (FIGS. 2B and 2C) that learns how to decode the fixed-length utterance embedding 204. The decoder portion 330 may decode the fixed-length utterance embedding 204 into a plurality of fixed-length predicted frames 260 (e.g., to predict pitch (F0), energy (C0), or spectral characteristics for the utterance embedding 204). As will become apparent, the autoencoder 300 is trained so that the number of predicted frames 260 output from the decoder portion 330 is equal to the number of reference frames 210 input to the encoder portion 320. Moreover, the autoencoder 300 is trained so that data associated with the reference and predicted frames 210, 260 substantially match one another.

Referring to FIG. 2A, the encoder portion 320 receives the sequence of fixed-length reference frames 210 from the input reference audio signal 202. The input reference audio signal 202 may include a spoken utterance of human speech recorded by a microphone that includes a target prosody. The encoder portion 320 may receive multiple reference audio signals 202 for a same spoken utterance, but with varying prosodies (i.e., the same utterance can be spoken in multiple different ways). For example, the same spoken utterance may vary in prosody when the spoken reference is an answer to a question compared to when the spoken utterance is a question. The reference frames 210 may each include a duration of 5 milliseconds (ms) and represent one of a contour of pitch (F0) or a contour of energy (C0) for the reference audio signal 202. In parallel, the encoder portion 320 may also receive a second sequence of reference frames 210 each including a duration of 5 ms and representing the other one of the contour of pitch (F0) or the contour of energy (C0) for the reference audio signal 202. Accordingly, the sequence reference frames 210 sampled from the reference audio signal 202 provide a duration, pitch contour, and/or energy contour to represent prosody for the reference audio signal 202. The length or duration of the reference audio signal 202 correlates to a sum of the total number of reference frames 210.

The encoder portion 320 includes hierarchical levels of reference frames 210, phonemes 220, 220a, syllables 230, 230a, words 240, 240a, and sentences 250, 250a for the reference audio signal 202 that clock relative to one another. For instance, the level associated with the sequence of reference frames 210 clocks faster than the next level associated with the sequence of phonemes 220. Similarly, the level associated with the sequence of syllables 230 clocks slower than the level associated with the sequence of phonemes 330 and faster than the level associated with the sequence of words 240. Accordingly, the slower clocking layers receive, as input, an output from faster clocking layers so that the output after the final clock (i.e., state) of a faster layer is taken as the input to the corresponding slower layer to essentially provide a sequence-to-sequence encoder. In the examples shown, the hierarchical levels include Long Short-Term Memory (LSTM) levels.

FIG. 2A depicts an example of the hierarchical levels for a reference audio signal 202. In this example, the reference audio signal 202 includes one sentence 240, 240A with three words 240, 240A-C. The first word 240, 240A includes two syllables 230, 230Aa-Ab. The second word 240, 240B includes one syllable 230, 230Ba. The third word 240, 240a includes two syllables 230, 230Ca-Cb. The first syllable 230, 230Aa of the first word 240, 240A includes two phonemes 220, 220Aa1-Aa2. The second syllable 230, 230Ab of the first word 240, 240A includes one phoneme 220, 220Ab1. The first syllable 230, 230Ba of the second word 240, 240B includes three phonemes 220, 220Ba1-Ba3. The first syllable 230, 230Ca of the third word 240, 240C includes one phoneme 220, 220Ca1. The second syllable 230, 230Cb of the third word 240, 240C includes two phonemes 220, 220Cb1-Cb2.

In some examples, the encoder portion 320 first encodes the sequence of reference frames 210 into frame-based syllable embeddings 232, 232Aa-Cb. In some implementations, the reference frames 210 define a sequence of phonemes 220Aa1-220Cb2. Here, instead of encoding a subset of reference frames 210 into one or more phonemes 220, the encoder portion 320 instead accounts for the phonemes 220 by encoding phone level linguistic features 222, 222Aa1-Cb2 into phone feature-based syllable embeddings 234, 234Aa-Cb. Each respective syllable embedding 232, 234 may refer to a numerical vector indicative of a duration, pitch (F0), and/or energy (C0) associated with the corresponding syllable 230. Moreover, each syllable embedding 232, 234 is indicative of a corresponding state for the level of syllables 230.

Referring to FIG. 2A, the blocks in the hierarchical layers that include a diagonal hatching pattern correspond to linguistic features for a particular level of the hierarchy. With the frame-based syllable embeddings 232 and the phone feature-based syllable embeddings 234, the encoder portion 320 encodes these syllable embeddings 232, 234 with other linguistic features. For example, the encoder portion 320 encodes the syllable embeddings 232, 234 with syllable level linguistic features 236, 236Aa-Cb, word level linguistic features 242, 242A-C, and/or sentence level linguistic features 252, 252A. By encoding the syllable embeddings 232, 234 with the linguistic features 236, 242, 252, the encoder portion 320 generates an utterance embedding 204 for the reference audio signal 202. The utterance embedding 204 may be stored in the data storage 130 (FIG. 1) along with a respective transcript 206 (e.g., textual representation) of the reference audio signal 204. From the transcript 206, the linguistic features 222, 236, 242, 252 may be extracted and stored for use in conditioning the training of the hierarchical linguistic structure 200. The linguistic features (e.g., linguistic features 222, 236, 242, 252) may include, without limitation, individual sounds for each phoneme, whether each syllable is stressed or un-stressed, the type of each word (e.g., noun/adjective/verb) and/or the position of the word in the utterance, and whether the utterance is a question or phrase.

In the example of FIG. 2A, encoding blocks 322, 322Aa-Cb are shown to depict the combination of the linguistic features 236, 242, 252 with the syllable embeddings 232, 234. Here, the blocks 322 are sequence encoded at a syllable rate to generate the utterance embedding 204. As an illustration, the first block 322Aa is fed as an input into a second block 322Ab. The second block 322Ab is fed as an input into a third block 322Ba. The third block 322Ca is fed as an input into the fourth block 322Ca. The fourth block 322Ca is fed into the fifth block 322Cb. In some configurations, the utterance embedding 204 includes a mean and a standard deviation a for each reference audio signal 202 where the mean and the standard deviation a are with respect to the training data of multiple reference audio signals 202.

In some implementations, each syllable 230 receives, as input, a corresponding encoding of a subset of reference frames 210 and includes a duration equal to the number of reference frames 210 in the encoded subset. In the example shown, the first seven fixed-length reference frames 210 are encoded into syllable 230Aa; the next four fixed-length reference frames 210 are encoded into syllable 230Ab; the next eleven fixed-length reference frames 210 are encoded into syllable 230Ba; the next three fixed-length reference frames 210 are encoded into syllable 230Ca; and the final six fixed-length reference frames 210 are encoded into syllable 230Cb. Thus, each syllable 230 in the sequence of syllables 230 may include a corresponding duration based on the number of reference frames 210 encoded into the syllable 230 and corresponding pitch and/or energy contours. For instance, syllable 230Aa includes a duration equal to 35 ms (i.e., six reference frames 210 each having the fixed-length of five milliseconds) and syllable 230Ab includes a duration equal to 20 ms (i.e., four reference frames 210 each having the fixed-length of five milliseconds). Thus, the level of reference frames 210 clocks a total of ten times for a single clocking between the syllable 230Aa and the next syllable 230Ab at the level of syllables 230. The duration of the syllables 230 may indicate timing of the syllables 230 and pauses in between adjacent syllables 230.

In some implementations, the utterance embedding 204 generated by the encoder portion 320 is a fixed-length utterance embedding 204 that includes a numerical vector representing a prosody of the reference audio signal 202. In some examples, the fixed-length utterance embedding 204 includes a numerical vector having a value equal to "128" or "256". The encoder portion 320 may encode a plurality of reference audio signals 202 each corresponding to a same spoken utterance/phrase, but with varying prosodies, i.e., each reference audio signal 202 conveys the same utterance but is spoken differently.

Referring to FIGS. 2B and 2C, the decoder portion 330 of the variational autoencoder 300 is configured to produce a plurality of syllable embeddings 232, 234 (e.g., fixed-length syllable embeddings) by initially decoding an utterance embedding 204 that represents a prosody for an utterance. During training, the utterance embedding 204 may include the utterance embedding 204 output from the encoder portion 320 of FIG. 2A by encoding the plurality of fixed-length reference frames 210 sampled from the reference audio signal 202. Thus, the decoder portion 330 is configured to back-propagate the utterance embedding 204 during training to generate the plurality of fixed-length predicted frames 260 that closely match the plurality of fixed-length reference frames 210. For instance, fixed-length predicted frames 260 for both pitch (F0) and energy (C0) may be generated in parallel to represent a target prosody (e.g., predicted prosody) that substantially matches the reference prosody of the reference audio signal 202 input to the encoder portion 320 as training data. Additionally or alternatively, the fixed-length predicted frames 260 may be spectral frames (e.g., mel frames) that may be provided to the TTS system 120 (FIG. 1). In some examples, the TTS system 120 (FIG. 1) uses the fixed-length predicted frames 260 to produce synthesized speech 122 with a selected prosody based on the fixed-length utterance embedding 204. For instance, a unit selection module, a WaveNet module, or a neural vocoder of the TTS system 120 may use the frames 260 to produce the synthesized speech 132 having the intended prosody.

In the example shown, the decoder portion 330 decodes the utterance embedding 204 (e.g., numerical value of "256" or "128") received from the encoder portion 320 (FIG. 2A) into hierarchical levels. For instance, the hierarchical levels include levels that correspond to sentences 250, 250b, words 240, 240b, syllables 230, 230b, phonemes 220, 220b, and the fixed-length predicted frames 260. Specifically, the fixed-length utterance embedding 204 corresponds to a variational layer of hierarchical input data for the decoder portion 330 and each of the stacked hierarchical levels include Long Short-Term Memory (LSTM) processing blocks variably clocked to a length of the hierarchical input data. For instance, the syllable level 230 clocks faster than the word level 240 and slower than the phoneme level 220. The rectangular blocks in each level correspond to one or more LSTM processing cells for respective sentences, words, syllables, phonemes, or frames. Advantageously, the autoencoder 300 gives the LSTM processing cells of the word level 240 memory over the last 100 words, gives the LSTM cells of the syllable level 230 memory over the last 100 syllables, gives the LSTM cells of the phoneme level 220 memory over the last 100 phonemes, and gives the LSTM cells of the fixed-length pitch and/or energy frames 260 memory over the last 100 fixed-length frames 260. When the fixed-length frames 260 include a duration (e.g., frame rate) of five milliseconds each, the corresponding LSTM processing cells provide memory over the last 500 milliseconds (e.g., a half second).

Referring to FIGS. 2B and 2C, in some examples, the decoder portion 330 of the hierarchical linguistic structure 200 back-propagates the fixed-length utterance embedding 204 encoded by the encoder portion 320. For instance, FIG. 2B depicts the decoder portion 330 of the hierarchical linguistic structure 200 back-propagating the fixed-length utterance embedding 204 into one sentence 250, 250A, a sequence of three words 240A-240C, a sequence of five syllables 230Aa-230Cb, and a sequence of nine phonemes 230Aa1-230Cb2 to generate the sequence of predicted fixed-length frames 260. In some implementations such as FIG. 2C, the decoder portion 330, rather than back-propagating from the syllable level 230 to the phoneme level 220, back-propagates from the syllable level 230 to the frame level 210. Here, this approach may increase accuracy of the predicted frames 260 in situations where the phoneme alignment may be problematic for the model 200. The decoder portion 330 is conditioned upon linguistic features (e.g., linguistic features 222, 236, 242, 252) of the input text. In contrast to the encoder portion 320 (e.g., as shown in FIG. 2A) where outputs from faster clocking layers may be received as inputs by slower clocking layers, the decoder portion 330 includes outputs from slower clocking layers feeding faster clocking layers such that the output of a slower clocking layer is distributed to the input of the faster clocking layer at each clock cycle with a timing signal appended thereto.

Figure 3A:
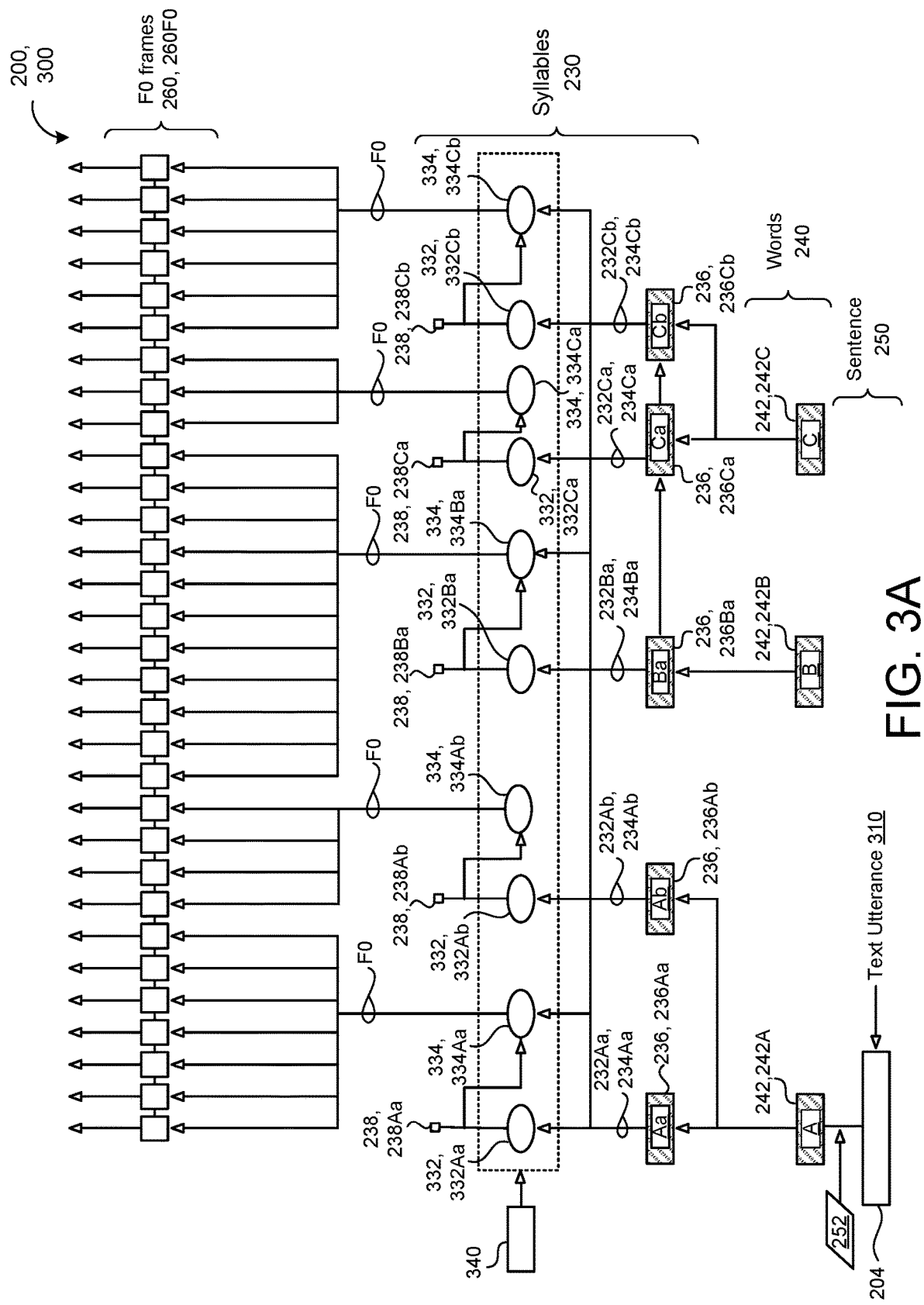
FIGS. 3A-3C are schematic views of example autoencoders for predicting syllabic characteristics of a text utterance.
Figure 3B:
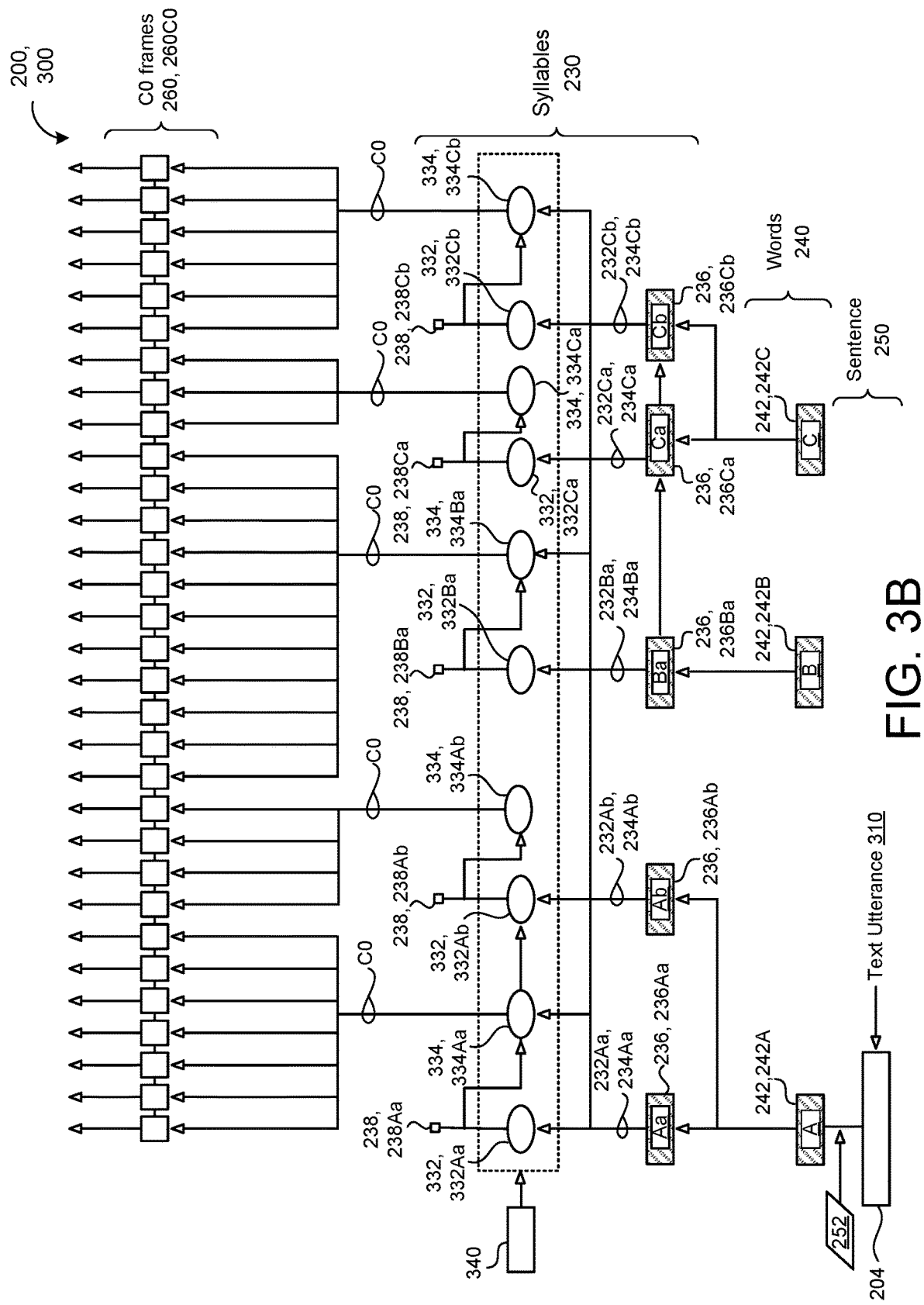
Figure 3C:
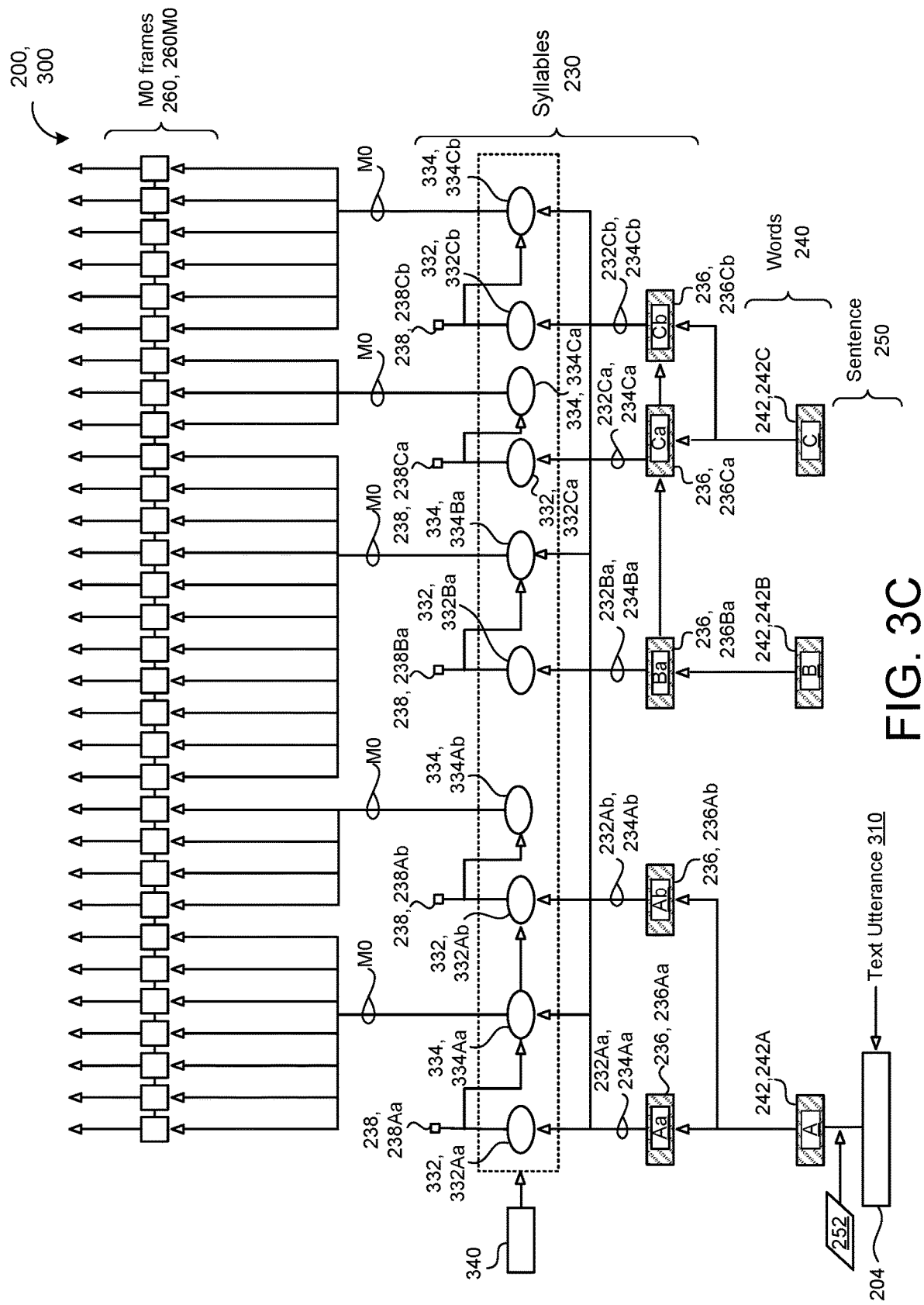

Referring to FIGS. 3A-3C, in some implementations, the autoencoder 300 uses the hierarchical linguistic structure 200 to predict a prosodic representation for a given text utterance 310 during inference. For instance, the autoencoder 300 predicts the prosodic representation for a given text utterance 310 by jointly predicting durations of syllables 230 and pitch F0 and/or energy C0 contours for each syllable 230 of the given text utterance 310. Since the text utterance 310 does not provide any context, semantic information, or pragmatic information to indicate an appropriate prosody for the text utterance 310, the autoencoder 300 selects an utterance embedding 204 as a latent variable to represent an intended prosody for the text utterance 310.

The utterance embedding 204 may be selected from the utterance embedding data storage 130 (FIG. 1). Each utterance embedding 204 in the storage 130 may be encoded by the encoder portion 320 (FIG. 2A) from a corresponding variable-length reference audio signal 202 (FIG. 2A) during training. Specifically, the encoder portion 310 compresses prosody of variable-length reference audio signals 202 into fixed-length utterance embeddings 204 during training and stores each utterance embedding 204 together with a transcript 206 of the corresponding reference audio signal 202 in the utterance embedding data storage 130 for use by the decoder portion 330 at inference. In the examples shown, the autoencoder 300 may first locate utterance embeddings 204 having transcripts 206 that closely match the text utterance 310 and then select one of the utterance embeddings 204 to predict the prosodic representation 302 (FIG. 1) for the given text utterance 310. In some examples, the fixed-length utterance embedding 204 is selected by picking a specific point in a latent space of embeddings 204 that likely represents particular semantics and pragmatics for a target prosody. In other examples, the latent space is sampled to choose a random utterance embedding 204 for representing the intended prosody for the text utterance 310. In yet another example, the autoencoder 300 models the latent space as multidimensional unit Gaussian by choosing a mean of the utterance embeddings 204 having closely matching transcripts 206 for representing a most likely prosody for the linguistic features of the text utterance 310. For instance, the autoencoder 300 uses the mean and/or standard deviation a associated with each utterance embedding 204 when selecting the utterance embedding 204 to generate the prosodic representation 302 for the text utterance 310. If the prosody variation of the training data is reasonably neutral, the last example of choosing the mean of utterance embeddings 204 is a reasonable choice.

FIGS. 3A-3C show the text utterance 310 having three words 240A, 240B, 240C represented in the word level 240 of the hierarchical linguistic structure 200. The first word 240A contains syllables 230Aa, 230Ab. The second word 240B contains one syllable 230Ba. The third word 240C contains syllables 230Ca, 230Cb. Accordingly, the syllable level 230 of the hierarchical linguistic structure 200 includes a sequence of five syllables 230Aa-230Cb of the text utterance 310. At the syllable level 230 of LSTM processing cells, the autoencoder 300 is configured to produce/output a first syllable embedding (e.g., the frame-based syllable embedding 232) and a second syllable embedding (e.g., the phone feature-based syllable embedding 234). To output the first syllable embeddings 232Aa, 232Ab, 232Ba, 232Ca, and 232Cb, the autoencoder 300 uses the following inputs: the fixed-length utterance embedding 204; utterance-level linguistic features (e.g., sentence-level linguistic features 252) associated with the text utterance 310; word-level linguistic features 242 associated with the word 240 that contains the syllable 230; and syllable-level linguistic features 236 for the syllable 230. To output the second syllable embeddings 234Aa, 234Ab, 234Ba, 234Ca, and 234Cb, the autoencoder 300 uses the phone-level linguistic features 222 associated with the syllable 230. The utterance-level linguistic features 252 may include, without limitation, whether or not the text utterance 320 is a question, an answer to a question, a phrase, a sentence, etc. In some examples, DVectors or other complex speaker identity representations may be included as an utterance-level linguistic feature 252. The word-level linguistic features 242 may include, without limitation, a word type (e.g., noun, pronoun, verb, adjective, adverb, etc.) and a position of the word in the text utterance 310. The syllable-level linguistic features 236 may include, without limitation, whether the syllable 230 is stressed or unstressed. In some implementations, DVectors or other complex speaker identity representations may be included as a linguistic feature at a level below an utterance-level (e.g., a word-level 240 or syllable-level 230).

In the examples shown, each syllable 230Aa, 230Ab, 230Ba, 230Ca, 230Cb in the syllable level 230 may be associated with a corresponding LSTM processing cell that outputs a corresponding syllable embedding 232Aa-Cb, 234Aa-Cb for decoding the individual fixed-length predicted pitch (F0) frames 260, 260F0 (FIG. 3A), for decoding the individual fixed-length predicted energy (C0) frames 260, 260C0 (FIG. 3B), and/or for decoding the individual fixed-length spectral (M0) frames 260, 260M0. In some implementations, the autoencoder 300 decodes two or more types of frames F0, C0, M0 in parallel. FIG. 3A shows each syllable 230 in the syllable level 230 including a plurality of fixed-length predicted pitch (F0) frames 260F0 that indicate a duration (timing and pauses) and a pitch contour for the syllable 230. Here, the duration and the pitch contour correspond to a prosodic representation of the syllable 230. FIG. 3B shows each syllable 230 in the syllable level 240 including a plurality of fixed-length predicted energy (C0) frames 260C0 that indicate a duration and an energy contour for the syllable 230.

The first syllable 230Aa (i.e., LSTM processing cell Aa) in the syllable level 230 receives the fixed-length utterance embedding 204, utterance-level linguistic features 252 associated with the text utterance 310, word-level linguistic features 242A associated with the first word 230A, and the syllable-level linguistic features 236Aa for the syllable 230Aa as inputs for producing the corresponding syllable embedding 232Aa. The second syllable 230Ab in the syllable level 230 receives the fixed-length utterance embedding 204, the utterance-level linguistic features 252 associated with the text utterance 310, the word-level linguistic features 242A associated with the first word 240A, and corresponding syllable-level linguistic features 236 for the syllable 230Ab as inputs for producing the corresponding syllable embedding 232Ab. Here, when the autoencoder 300 decodes the text utterance 310 into syllable embeddings 232, 234, these embeddings 232, 234 form a state 332 for each syllable 230 (e.g., shown as states 332, 332Aa-Cb). When the autoencoder 300 forms subsequent states 332, the autoencoder 300 also receives the state of the preceeding syllable 230. In other words, each LSTM processing cell of the syllable level 230 receives the state 232 of the immediately preceding LSTM processing cell of the syllable level 230. In some configurations, each LSTM processing cell of the syllable level 230 receives each state 232 preceding LSTM processing cell of the current syllable level 230. For example, an LSTM processing cell associated with the second syllable 230Ab receives the state 332, 332Aa of the preceding first syllable 230Aa. As illustrated by FIGS. 3A-3C, the autoencoder 300 produces the corresponding syllable embeddings 232Ba-Cb, 234Ba-CB for the remaining sequence of syllables 230Ba, 230Ca, 230Cb in the syllable level 230 in a similar manner. Additionally or alternatively, the autoencoder 300 may decode the higher level linguistic features (e.g., sentence features 252, word features 242, etc.) with the one or more syllable embeddings 232, 234 by concatenation.

Figure 3D:
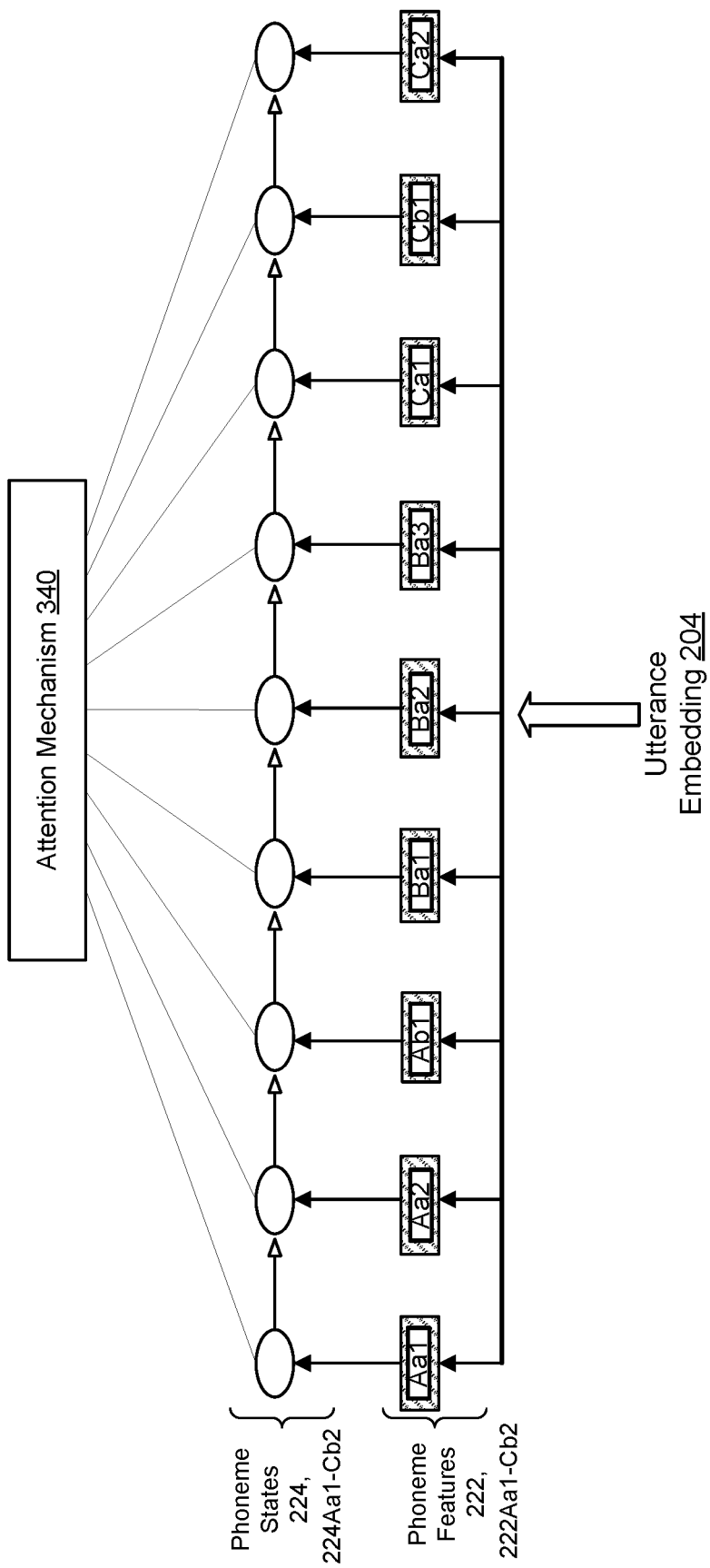
FIG. 3D is a schematic view of an example attention mechanism configured to give attention to phone level features forming encoded phoneme states.

Referring to FIG. 3D, the phoneme level 220 of the hierarchical linguistic structure 200 includes a sequence of nine phonemes 220Aa1-220Cb2. In some implementations, the autoencoder 300 encodes the phoneme-level linguistic features 222 associated with each phoneme 220Aa1-220Cb2 into phoneme encoded states 224, 224Aa1-Ca2. The phoneme-level linguistic features 222 may include, without limitation, an identity of sound for the corresponding phoneme 220. As illustrated in FIG. 3D, an attention mechanism 340 is configured to give attention to the phone level features 222, 22Aa1-Cb2 forming the encoded phoneme states 224. With this approach, the autoencoder 300 does not need to rely on, nor predict, a phoneme duration, but rather predicts the syllable duration 238 for each syllable 230 using the attention mechanism 340 with attention to phone level linguistic features 222.

Generally speaking an attention mechanism 340 is an alignment model that correlates (e.g., by scoring) an input with an output. With encoded hidden states, attention mechanisms 340 may form a set of weights that define how much attention each hidden state (e.g., encoded phoneme state 224) should be considered for each output (e.g., predicted frames 260). There may be different types of attention mechanisms 340 that use different alignment score functions. Some examples of these attention mechanisms 340 include content-based attention, additive attention, location-based attention, general attention, dot-product attention, and scaled dot product attention. Broader categories of attention mechanisms 340 include self-attention, global/soft attention, and/or local/hard attention. In some examples, the alignment score of the attention mechanism 340 is parameterized by a feed-forward network with a single hidden layer (e.g., the phoneme layer 220 of encoded phoneme states 224). In these examples, the feed-forward network may be jointly trained with other parts of the autoencoder 300.

The attention mechanism 340 of the autoencoder 300 may be based on any of these types of attention models. In other words, the autoencoder 300 may be designed to score hidden states 224 based on the phone-level linguistic features 222 according to different attention approaches. In some examples, the attention mechanism 340 takes the form of monotonically shifting, location sensitive attention (i.e., a location-based attention). Here, the location sensitive attention for the attention mechanism 300 may be constrained by a window. In some configurations, the window corresponds to phoneme information for a current syllable 230 being processed by the autoencoder 300. In other configurations, the window may to expanded to include adjacent syllables 230 (e.g., preceding or subsequent) to the current syllable 230 being processed by the autoencoder 300. In some implementations, the attention mechanism 340 is a transformer based on self-attention mechanisms. When using a transformer as the attention mechanism 340, the attention mechanism 340 may use the phone-level linguistic features 222 as inputs rather than the encoded phone-level linguistic features 222 at encoded phoneme state 224.

With continued reference to FIGS. 3A-3C, in some examples, the autoencoder 300 uses two decoders (e.g., represented in circles). Each of these decoders of the autoencoder 300 may receive as inputs the syllable embeddings 232, 234. A first decoder (e.g., at a first syllable state 332) uses the syllable embeddings 232, 234 along with the attention of the attention mechanism 340 to predict a number of frames for a particular syllable 230. For that particular syllable 230, the autoencoder 300 then uses a second decoder (e.g., at the second syllable state 334) to sequence decode the number of frames predicted by the first decoder (e.g., at the first syllable state 332). Based on number of predicted frames 260, the autoencoder 300 generates predicted frames 260. In other words, the predicted syllable duration, using the attention mechanism 340 for each syllable 230, may determine a number of fixed-length predicted pitch (F0) frames 260F0 (e.g., as shown in FIG. 3A), a number of fixed-length predicted energy (C0) frames 260C0 (e.g., as shown in FIG. 3B), and/or a number of fixed-length predicted spectral (M0) frames 260M0 (e.g., as shown in FIG. 3C). Although FIGS. 3A-3C depict a single attention mechanism 340, this is merely for simplicity of illustration. For each syllable 230 of a text utterance 310, the autoencoder 300 uses the attention mechanism 340 at states 332 and 334 to generate the predicted frames 260 corresponding to a syllable 230. For instance, FIGS. 3A-3C depict the attention mechanism 340 interacting with a dotted box to illustrate that the autoencoder 300 uses the attention mechanism 340 at each state 332, 334 for each syllable 230.

Based on the attention mechanism 340 and the syllable embeddings 232Aa, 234Aa, the autoencoder 300 predicts a syllable duration 238, 238Aa for the first syllable 230Aa corresponding to seven predicted frames 260. At state 334, 334Aa for the first syllable 230Aa, the autoencoder 300 decodes seven predicted frames 260. For the second syllable 230Ab, based on the attention mechanism 340 and the syllable embeddings 232Aa-Ab, 234Aa-Ab, the autoencoder 300 predicts a syllable duration 238, 238Ab of four predicted frames 260. At state 334, 334Ab for the second syllable 230Ab, the autoencoder 300 decodes four predicted frames 260. For the third syllable 230Ba, based on the attention mechanism 340 and the syllable embeddings 232Aa-Ba, 234Aa-Ba, the autoencoder 300 predicts a syllable duration 238, 238Ba of eleven predicted frames 260. At state 334, 334Ba for the third syllable 230Ba, the autoencoder 300 decodes eleven predicted frames 260. For the fourth syllable 230Ca, based on the attention mechanism 340 and the syllable embeddings 232Aa-Ca, 234Aa-Ca, the autoencoder 300 predicts a syllable duration 238, 238Ca of three predicted frames 260. At state 334, 334Ca for the fourth syllable 230Ca, the autoencoder 300 decodes three predicted frames 260. For the fifth syllable 230Cb, based on the attention mechanism 340 and the syllable embeddings 232Aa-Cb, 234Aa-Cb, the autoencoder 300 predicts a syllable duration 238, 238Cb of six predicted frames 260. At state 334, 334Cb for the fifth syllable 230Cb, the autoencoder 300 decodes six predicted frames 260.

Here, this system 100 uses an autoencoder 300 to focus on syllables 230 in order to predict frames 260 (e.g., without the phoneme level directly influencing the hierarchical linguistic structure 200). However, the approaches herein may be adapted to focus on other layers (e.g., sentences 250, words 240, etc.) of the hierarchical linguistic structure 200. For example, the autoencoder 300 focuses on words 240 or sentences 250 to predict frames 260. In these other approaches, one or more different levels (e.g., similar to the phoneme level) may be removed from the hierarchical linguistic structure 200 as a tradeoff for focusing on a particular level. In these approaches, the attention mechanism 340 may also be adapted accordingly to focus on one or more particular linguistic layer.

Figure 4:
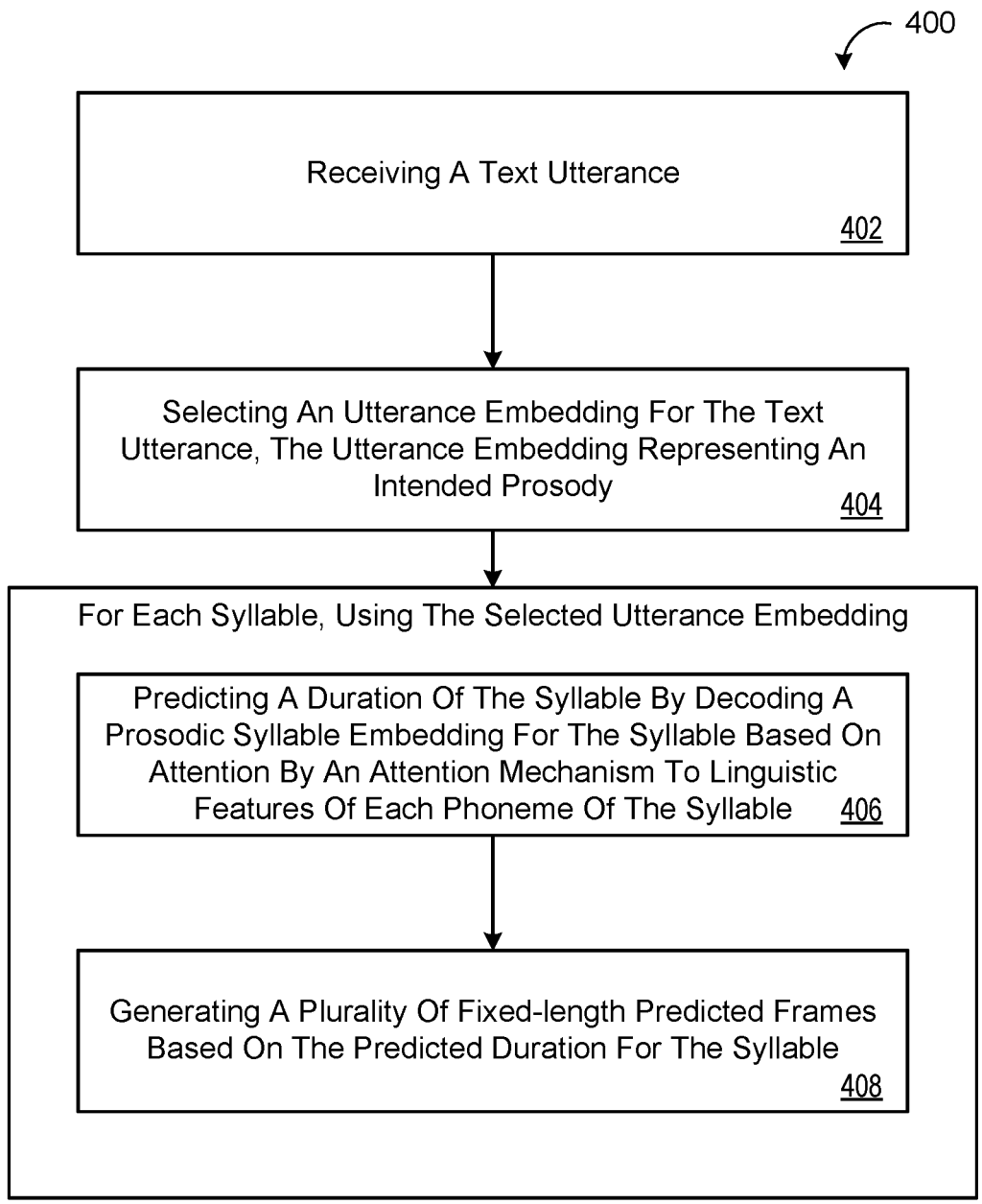
FIG. 4 is a flowchart of an example arrangement of operations for a method of predicting a representation of a received text utterance.

FIG. 4 is a flow chart of an example arrangement of operations for a method 400 of predicting a prosodic representation 302 for a text utterance 310. The method 400 may be described with reference to FIGS. 1-3C. The memory hardware 124 residing on the computer system 110 of FIG. 1 may store instructions that when executed by the data processing hardware 112 cause the data processing hardware 112 to execute the operations for the method 400. At operation 402, the method 400 includes receiving the text utterance 310. The text utterance 310 has at least one word 240, each word 240 having at least one syllable 230, each syllable 230 having at least one phoneme 220. At operation 404, the method 400 includes selecting an utterance embedding 204 for the text utterance 310. The utterance embedding 204 represents an intended prosody. As used herein, the selected utterance embedding 204 is used to predict the prosodic representation 302 of the text utterance 310 for use by a TTS system 120 to produce synthesized speech 122 from the text utterance 310 and having the intended prosody. The utterance embedding 204 may be represented by a fixed-length numerical vector. The numerical vector may include a value equal to "256". To select the utterance embedding 204 for the text utterance 310, the data processing hardware 112 may first query the data storage 130 to locate utterance embeddings 204 having transcripts 206 that closely match the text utterance 310 and then select the utterance embeddings 204 to predict the prosodic representation 302 for the given text utterance 310. In some examples, the fixed-length utterance embedding 204 is selected by picking a specific point in a latent space of embeddings 204 that likely represents particular semantics and pragmatics for a target prosody. In other examples, the latent space is sampled to choose a random utterance embedding 204 for representing the intended prosody for the text utterance 310. In yet another example, the data processing hardware 112 models the latent space as multidimensional unit Gaussian by choosing a mean of the utterance embeddings 204 having closely matching transcripts 206 for representing a most likely prosody for the linguistic features of the text utterance 310.

At operation 406, for each syllable 230, using the selected utterance embedding 204, the method 400 includes predicting a duration 238 of the syllable 230 by decoding a prosodic syllable embedding 232, 234 for the syllable 230 based on attention by an attention mechanism 340 to linguistic features 222 for each phoneme 220 of the syllable 230. At operation 408, for each syllable 230, using the selected utterance embedding 204, the method 400 includes generating a plurality of fixed-length predicted frames 260 based on the predicted duration 238 for the syllable 230.

Figure 5:
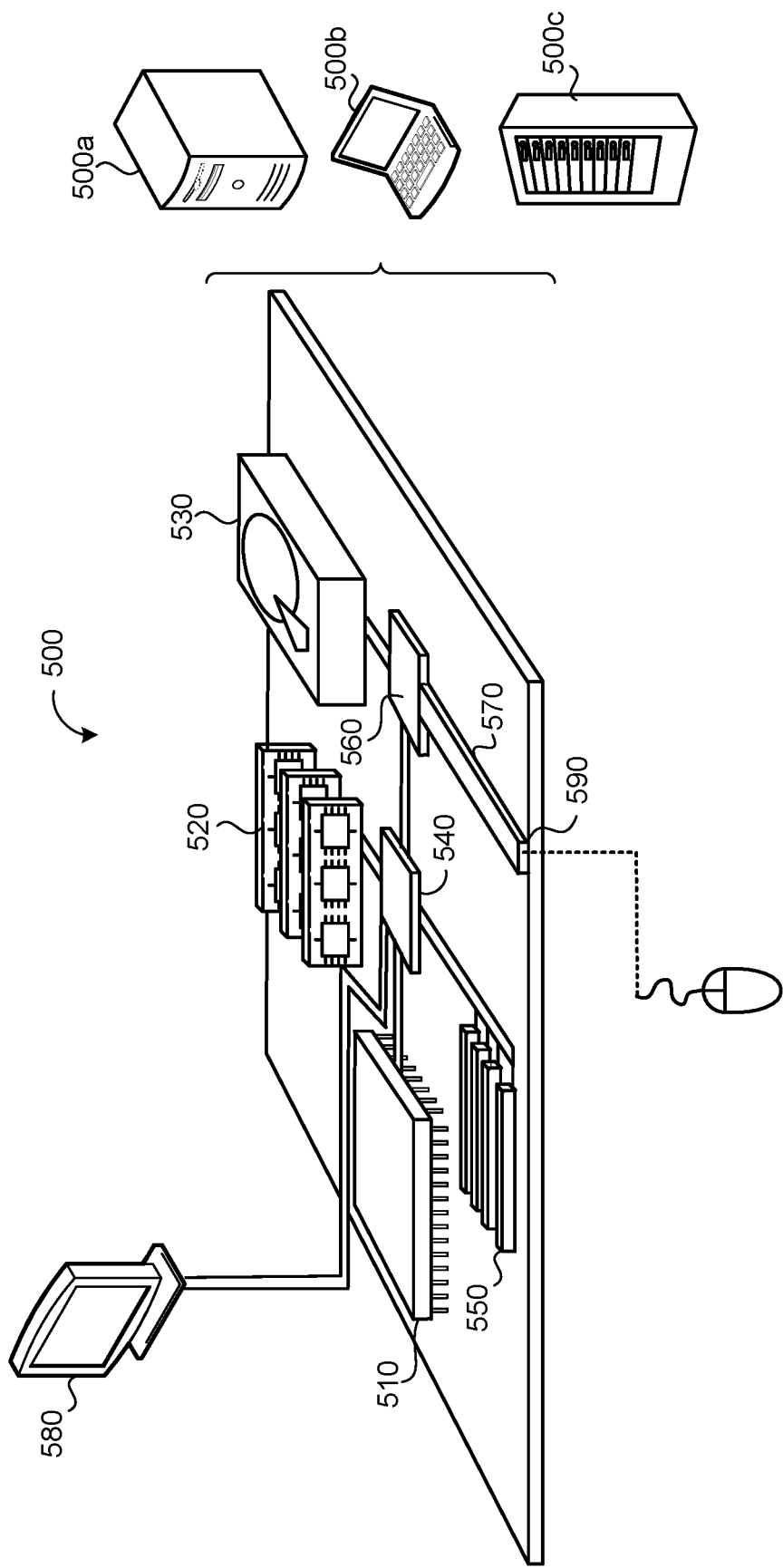
FIG. 5 is a schematic view of an example computing device that may be used to implement the systems and methods described herein.

FIG. 5 is schematic view of an example computing device 500 that may be used to implement the systems (e.g., hierarchical structure 200, autoencoder 300, and/or attention mechanism 340) and methods (e.g., method 400) described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510 (e.g., data processing hardware), memory 520 (e.g., memory hardware), a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed on data processing hardware that causes the data processing hardware to perform operations comprising:
   receiving a text utterance having at least one word, each word having at least one syllable, each syllable having at least one phoneme;
   selecting an utterance embedding for the text utterance, the utterance embedding representing an intended prosody; and
   for each corresponding syllable, using the selected utterance embedding:
      predicting a duration of the corresponding syllable by decoding a prosodic syllable embedding for the corresponding syllable based on attention by an attention mechanism to linguistic features of each phoneme of an adjacent syllable to the corresponding syllable; and
      generating a plurality of fixed-length predicted frames based on the predicted duration for the corresponding syllable.

2. The method of claim 1, wherein the operations further comprise:
   predicting a pitch contour of the corresponding syllable based on the predicted duration of the corresponding syllable, and
   wherein the plurality of fixed-length predicted frames comprise fixed-length predicted pitch frames, each fixed-length predicted pitch frame representing part of the predicted pitch contour of the corresponding syllable.

3. The method of claim 1, wherein the operations further comprise, for each corresponding syllable, using the selected utterance embedding:
   predicting an energy contour of the corresponding syllable based on the predicted duration of the corresponding syllable; and
   generating a plurality of fixed-length predicted energy frames based on the predicted duration of the corresponding syllable, each fixed-length energy frame representing the predicted energy contour of the corresponding syllable.

4. The method of claim 1, wherein the plurality of fixed length predicted frames comprise fixed-length predicted spectral frames for the corresponding syllable.

5. The method of claim 1, wherein a network representing a hierarchical linguistic structure of the text utterance comprises:
   a first level including each word of the text utterance;
   a second level including each syllable of the text utterance; and
   a third level including each fixed-length predicted frame for each syllable of the text utterance.

6. The method of claim 1, wherein predicting the duration of the corresponding syllable comprises:
   for each phoneme associated with the adjacent syllable to the corresponding syllable:
      encoding one or more linguistic features of a corresponding phoneme;
      inputting the encoded one or more linguistic features into the attention mechanism; and
      applying the attention of the attention mechanism to the prosodic syllable embedding.

7. The method of claim 1, wherein the adjacent syllable to the corresponding syllable comprises one of a preceding adjacent syllable that precedes the corresponding syllable or a subsequent adjacent syllable that is subsequent to the corresponding syllable.

8. The method of claim 7, wherein predicting the duration of the corresponding syllable by decoding the prosodic syllable embedding for the corresponding syllable is further based on attention by the attention mechanism to linguistic features of each phoneme of another adjacent syllable to the corresponding syllable, the another adjacent syllable to the corresponding syllable comprising the other one of the preceding adjacent syllable or the subsequent adjacent syllable.

9. The method of claim 1, wherein the operations further comprise:
receiving training data including a plurality of reference audio signals, each reference audio signal comprising a spoken utterance of human speech and having a corresponding prosody; and
training a deep neural network for a prosody model by encoding each reference audio signal into a corresponding fixed-length utterance embedding representing the corresponding prosody of the reference audio signal.

10. The method of claim 9, wherein the operations further comprise generating the selected utterance embedding by encoding linguistic features for a plurality of linguistic units with a frame-based syllable embedding and a phone feature-based syllable embedding.

11. The method of claim 1, wherein the utterance embedding comprises a fixed-length numerical vector.

12. The method of claim 1, wherein the attention of the attention mechanism comprises location-based attention.

13. The method of claim 12, wherein the location-based attention comprises monotonically shifting, location sensitive attention, the monotonically shifting, location sensitive attention defined by a window of phoneme information for a respective syllable.

14. The method of claim 1, wherein the attention mechanism comprises a transformer.

15. A system comprising:
data processing hardware; and
memory hardware in communication with the data processing hardware, the memory hardware storing instructions that when executed on the data processing hardware cause the data processing hardware to perform operations comprising:
receiving a text utterance having at least one word, each word having at least one syllable, each syllable having at least one phoneme;
selecting an utterance embedding for the text utterance, the utterance embedding representing an intended prosody; and
for each corresponding syllable, using the selected utterance embedding:
predicting a duration of the corresponding syllable by decoding a prosodic syllable embedding for the corresponding syllable based on attention by an attention mechanism to linguistic features of each phoneme of an adjacent syllable to the corresponding syllable; and
generating a plurality of fixed-length predicted frames based on the predicted duration for the corresponding syllable.

16. The system of claim 15, wherein the operations further comprise:
predicting a pitch contour of the corresponding syllable based on the predicted duration of the corresponding syllable, and
wherein the plurality of fixed-length predicted frames comprise fixed-length predicted pitch frames, each fixed-length predicted pitch frame representing part of the predicted pitch contour of the corresponding syllable.

17. The system of claim 15, wherein the operations further comprise, for each corresponding syllable, using the selected utterance embedding:
predicting an energy contour of the corresponding syllable based on the predicted duration of the corresponding syllable; and
generating a plurality of fixed-length predicted energy frames based on the predicted duration of the corresponding syllable, each fixed-length energy frame representing the predicted energy contour of the corresponding syllable.

18. The system of claim 15, wherein the plurality of fixed length predicted frames comprise fixed-length predicted spectral frames for the corresponding syllable.

19. The system of claim 15, wherein a network representing a hierarchical linguistic structure of the text utterance comprises:
a first level including each word of the text utterance;
a second level including each syllable of the text utterance; and
a third level including each fixed-length predicted frame for each syllable of the text utterance.

20. The system of claim 15, wherein predicting the duration of the corresponding syllable comprises:
for each phoneme associated with the adjacent syllable to the corresponding syllable:
encoding one or more linguistic features of a corresponding phoneme;
inputting the encoded one or more linguistic features into the attention mechanism; and
applying the attention of the attention mechanism to the prosodic syllable embedding.

21. The system of claim 15, wherein the adjacent syllable to the corresponding syllable comprises one of a preceding adjacent syllable that precedes the corresponding syllable or a subsequent adjacent syllable that is subsequent to the corresponding syllable.

22. The system of claim 21, wherein predicting the duration of the corresponding syllable by decoding the prosodic syllable embedding for the corresponding syllable is further based on attention by the attention mechanism to linguistic features of each phoneme of another adjacent syllable to the corresponding syllable, the another adjacent syllable to the corresponding syllable comprising the other one of the preceding adjacent syllable or the subsequent adjacent syllable.

23. The system of claim 15, wherein the operations further comprise:
receiving training data including a plurality of reference audio signals, each reference audio signal comprising a spoken utterance of human speech and having a corresponding prosody; and
training a deep neural network for a prosody model by encoding each reference audio signal into a corresponding fixed-length utterance embedding representing the corresponding prosody of the reference audio signal.

24. The system of claim 23, wherein the operations further comprise generating the selected utterance embedding by encoding linguistic features for a plurality of linguistic units with a frame-based syllable embedding and a phone feature-based syllable embedding.

25. The system of claim 15, wherein the utterance embedding comprises a fixed-length numerical vector.

26. The system of claim 15, wherein the attention of the attention mechanism comprises location-based attention.

27. The system of claim 26, wherein the location-based attention comprises monotonically shifting, location sensitive attention, the monotonically shifting, location sensitive attention defined by a window of phoneme information for a respective syllable.

28. The system of claim 15, wherein the attention mechanism comprises a transformer.

* * * * *